(12) United States Patent
Angquist

(10) Patent No.: US 8,072,192 B2
(45) Date of Patent: Dec. 6, 2011

(54) AUXILIARY POWER SUPPLY WITH A COUPLING CAPACITOR BETWEEN A HIGH VOLTAGE LINE AND GROUND

(75) Inventor: Lennart Angquist, Enkoping (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 12/624,516

(22) Filed: Nov. 24, 2009

(65) Prior Publication Data

US 2010/0066173 A1 Mar. 18, 2010

Related U.S. Application Data

(63) Continuation of application No. PCT/EP2008/056396, filed on May 26, 2008.

(60) Provisional application No. 60/924,718, filed on May 29, 2007.

(51) Int. Cl.
*G05F 1/652* (2006.01)
*G05F 1/32* (2006.01)
(52) U.S. Cl. .................. 323/209; 363/52; 307/100
(58) Field of Classification Search .......... 323/206, 323/208–211; 307/100, 99, 102, 105; 363/52, 363/45, 47, 48, 91; 361/16
See application file for complete search history.

(56) References Cited

U.S. PATENT DOCUMENTS

| | | | | |
|---|---|---|---|---|
| 1,657,248 A | * | 1/1928 | Dubilier | 340/307 |
| 3,381,178 A | | 4/1968 | Rockefeller, Jr. | |
| 3,911,324 A | * | 10/1975 | Bishop | 361/18 |
| 3,967,189 A | * | 6/1976 | Maenicke | 323/358 |
| 4,121,270 A | * | 10/1978 | Peterson | 361/54 |
| 4,475,139 A | | 10/1984 | Chadwick | |
| 4,503,380 A | * | 3/1985 | Thanawala | 323/206 |
| 5,093,770 A | * | 3/1992 | Davenport | 363/74 |
| 6,335,613 B1 | * | 1/2002 | Sen et al. | 323/216 |

FOREIGN PATENT DOCUMENTS

| | | |
|---|---|---|
| EP | 1605576 A1 | 12/2005 |
| EP | 1626489 A2 | 2/2006 |
| JP | 59099961 A | 6/1984 |
| SE | 525006 C2 | 11/2004 |
| WO | 2004045046 A1 | 5/2004 |

OTHER PUBLICATIONS

International Search Report and Written Opinion of the International Searching Authority; PCT/EP2008/056396; Aug. 28, 2009; 11 pages.

* cited by examiner

*Primary Examiner* — Harry Behm
(74) *Attorney, Agent, or Firm* — St. Onge Steward Johnston & Reens LLC

(57) ABSTRACT

A power supply apparatus includes a coupling capacitor arranged to be connected on its first end to ground; a transformer including a primary winding and a secondary winding; a first rectifier bridge connected in parallel with the secondary winding; and an energy storage, to which a load is arranged to be connected. The primary winding is arranged to be connected between a second end of the coupling capacitor and a high voltage transmission line such that all current between the second end of the coupling capacitor and the high voltage transmission line passes through the primary winding. The energy storage is arranged to be charged by means of a current passing through the first rectifier bridge. Furthermore, the power supply apparatus includes a bypasser. A corresponding three-phase apparatus is also presented.

19 Claims, 4 Drawing Sheets

AUXILIARY POWER SUPPLY WITH A COUPLING CAPACITOR BETWEEN A HIGH VOLTAGE LINE AND GROUND

CROSS-REFERENCE TO RELATED APPLICATIONS

The present application is a continuation of pending International patent application PCT/EP2008/056396 filed on May 26, 2008, which designates the United States and claims priority from U.S. Provisional Patent Application Ser. No. 60/924,718 filed on May 29, 2007.

FIELD OF THE INVENTION

The present invention relates generally to power supply apparatuses, and more particularly to power supply for loads which are located on high potential relative ground.

BACKGROUND OF THE INVENTION

In power transmission networks, equipment is often connected to high potential relative ground. For example, platforms are used when capacitors are provided in series with high voltage transmission lines.

There is typically equipment onboard the platform which is used for protection, control and monitoring purposes. For example, current measuring systems can be used to convert analogue measured data to digital form and transmit them to ground level by data transmission via optical fibre. Other equipment is used to bypass the capacitor bank when the line current becomes too high due to short-circuits in the power transmission system. Auxiliary power is required for actuators and similar devices.

Auxiliary power for measurement systems that require only a fraction of a watt may be supplied through fibres from lasers on ground potential. However, equipment that includes fast-acting actuators for protection purposes, necessitates substantial amount of energy that is stored on high potential. If charging of the energy storage must be performed in a reasonable time (minutes) substantial power (hundreds of watts) must be provided.

Consequently, there is a need to improve how power is supplied to loads on platforms with high potential relative to ground.

SUMMARY OF THE INVENTION

An object of the present invention is to simplify power supply to loads on platforms with high potential relative to ground.

According to the invention there is provided a power supply apparatus comprising: a coupling capacitor arranged to be connected on its first end to ground; a transformer comprising a primary winding and a secondary winding; a first rectifier bridge connected in parallel with the secondary winding; and an energy storage, to which a load is arranged to be connected. The primary winding is connected on its first end to a second end of the coupling capacitor, and the second end of the primary winding is arranged to be connected to a high voltage transmission line. The energy storage is arranged to be charged by means of a current passing through the first rectifier bridge. Furthermore, the power supply apparatus comprises a bypass means.

By this arrangement, auxiliaries on a platform with high potential relative to ground, is able to be powered by means of the voltage difference to ground. The bypass means protects the auxiliaries from being over-powered from the relatively stiff current source provided through the transformer.

The power supply apparatus may be arranged to be connected to a high voltage transmission line with a rated line voltage of 110 kV to 765 kV rms line-to-line.

The coupling capacitor may be arranged to be directly connected to ground.

The energy storage may be connected in parallel with the first rectifier bridge.

The bypass means may comprise said transformer which, when operated in a saturation mode, limits power to the secondary winding of said transformer. Hence, a relatively simple construction protects any connected auxiliaries.

The bypass means may comprise controlled semiconductor components arranged as a bidirectional bypass circuit. For example, the bypass means may comprise: a second rectifier bridge connected in parallel with the primary winding; a first transistor connected with its collector and emitter in parallel with the second rectifier bridge and a controller. The semiconductor components allow logic control of the bypass using simple or advanced control structures. For example, discrete logic elements or central processing units (CPUs) may be used as controllers.

The controller may be arranged to continuously control the first transistor. In other words, the bypass means can be switched on and off during each half-cycle.

The controller may be arranged to switch in and out the first transistor with a duty cycle that is several periods of the network frequency.

The controller may be located on the secondary winding side, and command signals may be transferred from the controller to the first transistor via an optocoupler. The optocoupler provides isolation between the secondary winding side and the primary winding side.

The power supply apparatus may comprise an over-voltage limitation means which is independent of command signals to the first transistor. This second limitation allows for an additional security measure.

The over-voltage limitation means may comprise a zener diode.

The power supply apparatus may further comprise: a plurality of the transformers. Each of the plurality of transformers may comprise: a primary winding circuit, comprising the primary winding, the second rectifier bridge and the first transistor; and a secondary winding circuit, comprising the secondary winding, the first rectifier bridge and the energy storage. All primary windings of the plurality of transformers may be connected in a serial connection.

The power supply apparatus may further comprise: a capacitor connected in parallel with the serial connection of primary windings; a resistor connected in series with the parallel connection of the capacitor and the serial connection of primary windings; and a varistor connected in parallel between the serial connection of the resistor and the parallel connection of the capacitor and the serial connection of primary windings. The varistor may be connected to the coupling capacitor and the varistor may be arranged to be connected to the high voltage transmission line.

The resistor may be arranged to be connected to the high voltage transmission line and the capacitor may be connected to the coupling capacitor.

The resistor may be connected to the coupling capacitor and the capacitor may be arranged to be connected to the high voltage transmission line. The power supply apparatus may further comprise: one primary winding circuit comprising the primary winding, the second rectifier bridge and the first transistor; and a plurality of secondary winding circuits, wherein each secondary winding circuit comprises the secondary winding, the first rectifier bridge and the energy storage. The first primary winding circuit may be coupled to all of the secondary winding circuits in the transformer.

The bypass means may comprise: a second transistor connected with its collector and emitter in parallel with the first rectifier bridge; and a diode connected between the second transistor and the energy storage.

The power supply apparatus may further comprise a second coupling capacitor, and the two coupling capacitors may both be connected via a second transformer to ground and via a third transformer to the primary winding.

A second aspect of the invention is an apparatus comprising: a power supply apparatus according to the first aspect, wherein the first end of the coupling capacitor is connected to ground and the second end of the primary winding is connected to a high voltage transmission line.

A third aspect of the invention is a three phase power supply apparatus comprising three power supply apparatuses according to the first aspect, wherein each of the three power supply apparatuses is arranged to be connected to a transmission line of respective one of three phases.

It is to be noted that any feature of the first aspect, second aspect, or third aspect may be applied to any other aspect, where appropriate.

It is to be noted that, unless otherwise specified, the term 'connected' is herein to be construed as being galvanically connected.

Generally, all terms used in the claims are to be interpreted according to their ordinary meaning in the technical field, unless explicitly defined otherwise herein. All references to "a/an/the element, device, component, means, step, etc." are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
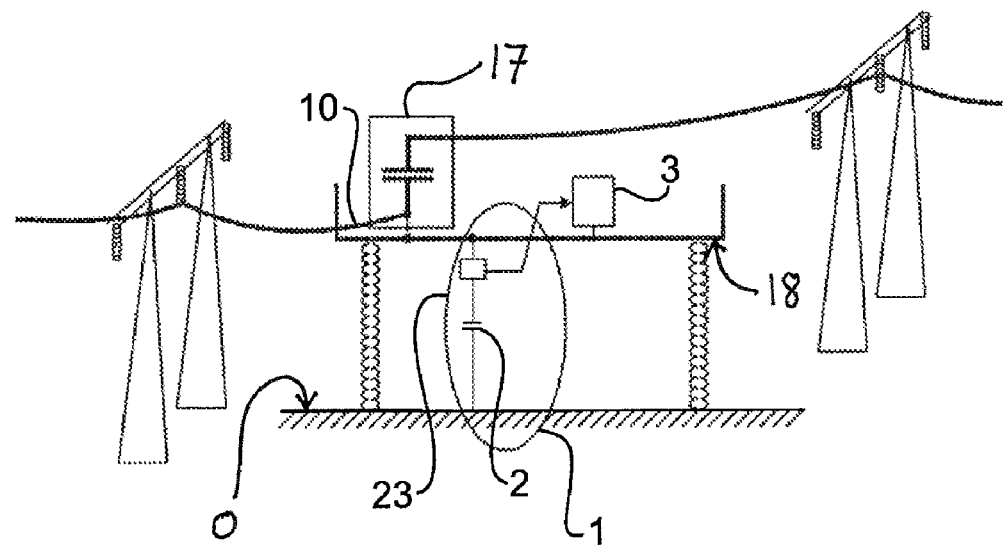
FIG. 1 is a schematic diagram illustrating a typical environment where the present invention can be embodied.

In FIG. 1, a main capacitor bank 17 has been inserted in series with a transmission line 10. The main capacitor bank 17 is physically located on a platform 18 (one for each phase) which is connected to one end of the capacitor bank 17. The platform 18 is insulated for the full Basic Insulation Level (BIL) applicable to the line 10. The rated line voltage for the transmission line 10 ranges from 110 kV to 765 kV rms line-to-line.

Some equipment onboard the platform 18 is used for protection, control and monitoring purposes. Typically current measuring systems are used to convert analogue measured data to digital form and transmit them to ground level by data transmission via optical fibre. Other equipment is used to bypass the capacitor bank 17 when the line current becomes too high due to short-circuits in the power transmission system. This requires auxiliary power for actuators and similar devices.

A high potential difference exists between the platform 18 and ground 0 whenever the line is energized. If a coupling capacitor 2 is connected between the platform 18 and ground 0 a current will pass, which is proportional to the phase-ground voltage of the power system. This current is used as a current source in the auxiliary power supply 1 according to the invention.

Coupling capacitors 2 are commercially available components for all normal transmission line voltages from 130 kV to the highest voltage levels 800 kV. They fulfil the established insulation requirements for transmission systems. The capacitance is in the nanofarad range. Typically the current at nominal voltage is less than one ampere.

FIGS. 2-4, 5a and 5b illustrate various embodiments of a power supply according to the present invention.

The principle of the embodiment of the invention is to let the stiff current through the coupling capacitor 2 feed an auxiliary power supply 23 at high potential. To do this, the current can pass through a primary winding 15 of a transformer 5 that has a secondary winding 16 that powers a rectifier bridge 6 that charges an electric energy storage element 7 such as a capacitor, a supercapacitor or a battery. As the primary winding 15 of the transformer 5 is fed from a current source it follows that power control should be implemented by some kind of bypass control as described in the following section.

A number of different implementations of a bypasser can be envisaged. Some cases are shown in FIGS. 2-4.

Figure 2:
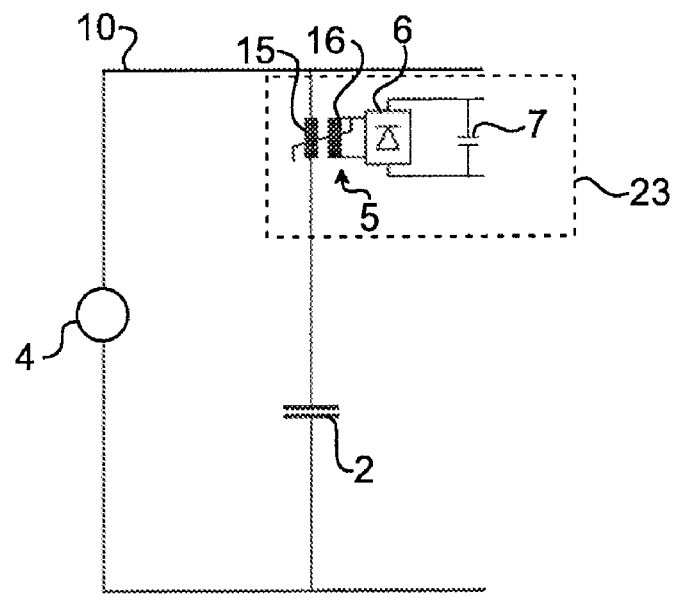
FIG. 2 is a schematic diagram illustrating an embodiment of the present invention.

In FIG. 2, the transformer 5 has been designed so that it becomes saturated when the desired voltage level in the storage device has been reached. The bypasser or bypass element in this case is the transformer magnetizing inductance.

Figure 3:
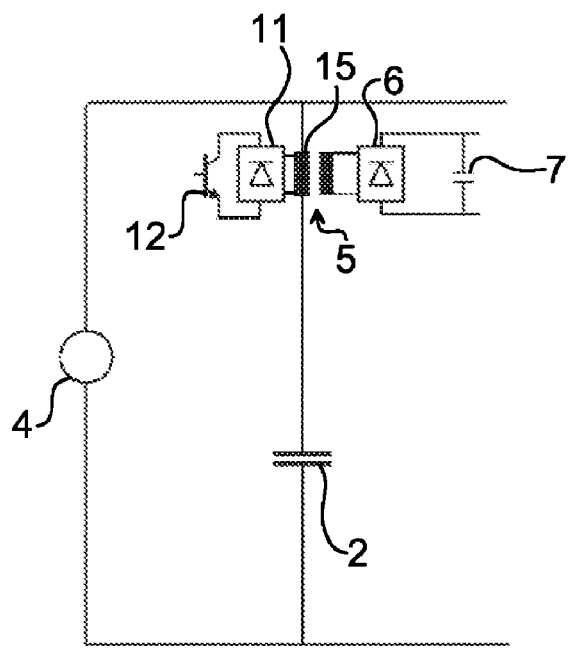
FIG. 3 is a schematic diagram illustrating a second embodiment of the present invention.
Figure 4:
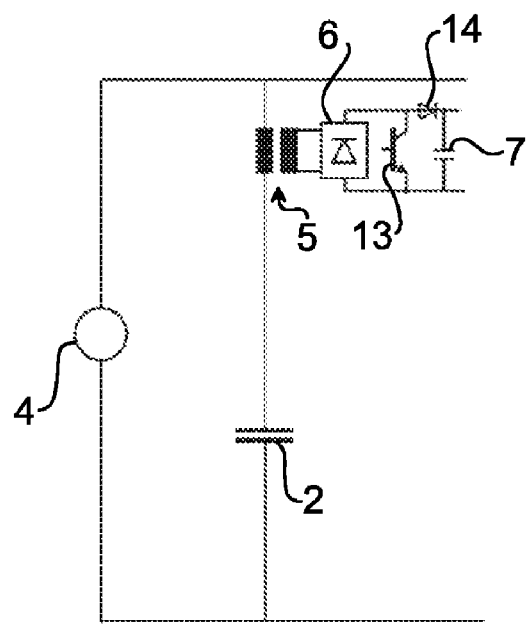
FIG. 4 is a schematic diagram illustrating a third embodiment of the present invention.

In FIG. 3, a bidirectional controlled bypass branch is provided in parallel with the primary winding 15 of the transformer. The bypass may be controlled so that it is continuously controlled (on/off during each half-cycle) or so that it is switched in/out with a duty-cycle that is several periods of the network frequency. The bidirectional bypass branch comprises a rectifier bridge 11 and a transistor 12.

A controller for the transistor 12 can be located on the auxiliary load side and the command signals to the bypass device can be transferred via an optocoupler that provides the isolation.

The bypass device can implement an over-voltage limitation that is independent on the command e.g. by using a zener-diode to open the bypass.

FIG. 4 illustrates an embodiment which is similar in structure to the embodiment illustrated in FIG. 3, but where the bypass means is located on the secondary winding side. Here, the controlled bypass branch is located in parallel with the secondary winding, continuously or intermittently controlled as described above. Hence, a transistor 13 is provided in parallel with the rectifier bridge 6. Furthermore, a diode is provided between the transistor 13 and the energy storage 7.

Figure 5A:
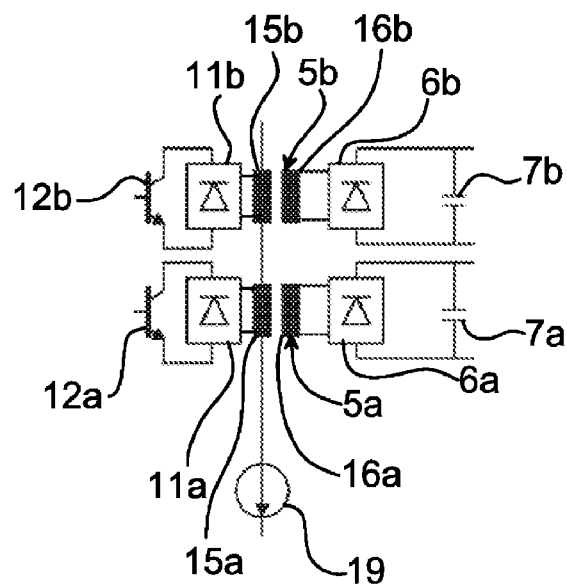
FIGS. 5a and 5b are a schematic diagrams illustrating a fourth and a fifth embodiment of the present invention.
Figure 5B:
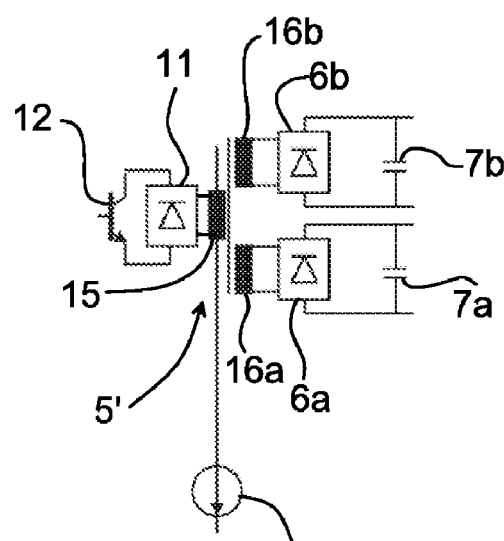

FIGS. 5a-b show two embodiments where several mutually isolated loads are powered. The primary windings of the transformers can be connected serially or in parallel depending on the power demand and the available primary current.

In the serial connection shown in FIG. 5a, a current source 19 is a symbolic representation of the current through the coupling capacitor 2 when it is energized. The bypass device, here comprising transistors 12a, 12b and rectifier bridges 11a, 11b, is placed on the primary side, in parallel with the primary winding 15a, 15b, of respective transformer 5a, 5b. There are secondary windings 16a, 16b, with rectifier bridges 6a, 6b and energy storages 7a and 7b for each respective power supply. By using a connection in series, individual control of the output voltage to the different loads is permitted.

FIG. 5b illustrates an embodiment with a common primary winding 15 and several secondary windings 16a, 16b. The parallel connection assumes that all the loads can be controlled by a common bypass device. It is to be noted that the bypass device can be located on the primary side as shown or in any of the secondary windings.

Figure 6:
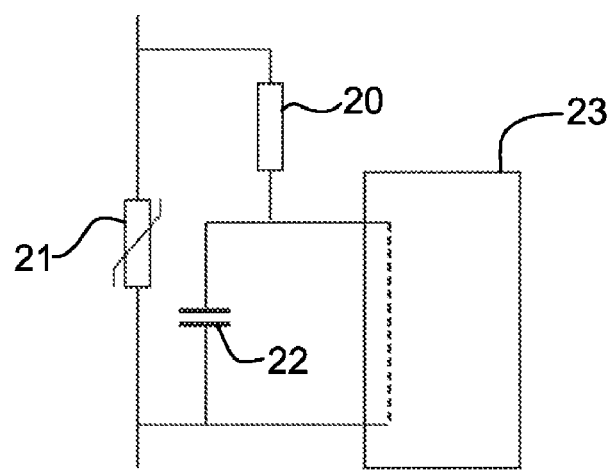
FIG. 6 is a schematic diagram illustrating a protective circuit for embodiments of the present invention.

Referring to FIGS. 1 and 6 show a transient protection circuit high frequency protector in an embodiment of the present invention. The voltage across the coupling capacitor is changed abruptly when the power line is being energized. The current through the capacitor 2 then contains very high spikes and high frequency components. In order protect the transformer and the bypass device, a circuit as shown in FIG. 6 can be utilized.

The voltage across the primary windings of the transformer (s) is limited by a varistor 21 in parallel with, for example, a chain of series-connected transformer windings 23. The knee voltage of the varistor 21 is selected so that is higher than the voltage that appears in steady state.

A resistor 20 limits the current that flows through the bypass elements. Furthermore, a protection capacitor 22 limits the voltage derivative across the bypass devices and transformers.

It is to be noted that the resistor 20 and the parallel connection of the protection capacitor 22 and the transformer windings 23 can switch places. In other words, the resistor can equally well be connected to the coupling capacitor 2 below what is shown in FIG. 6, and the protection capacitor 22 (in parallel with the transformer windings 23) can be connected to the power line.

Figure 7:
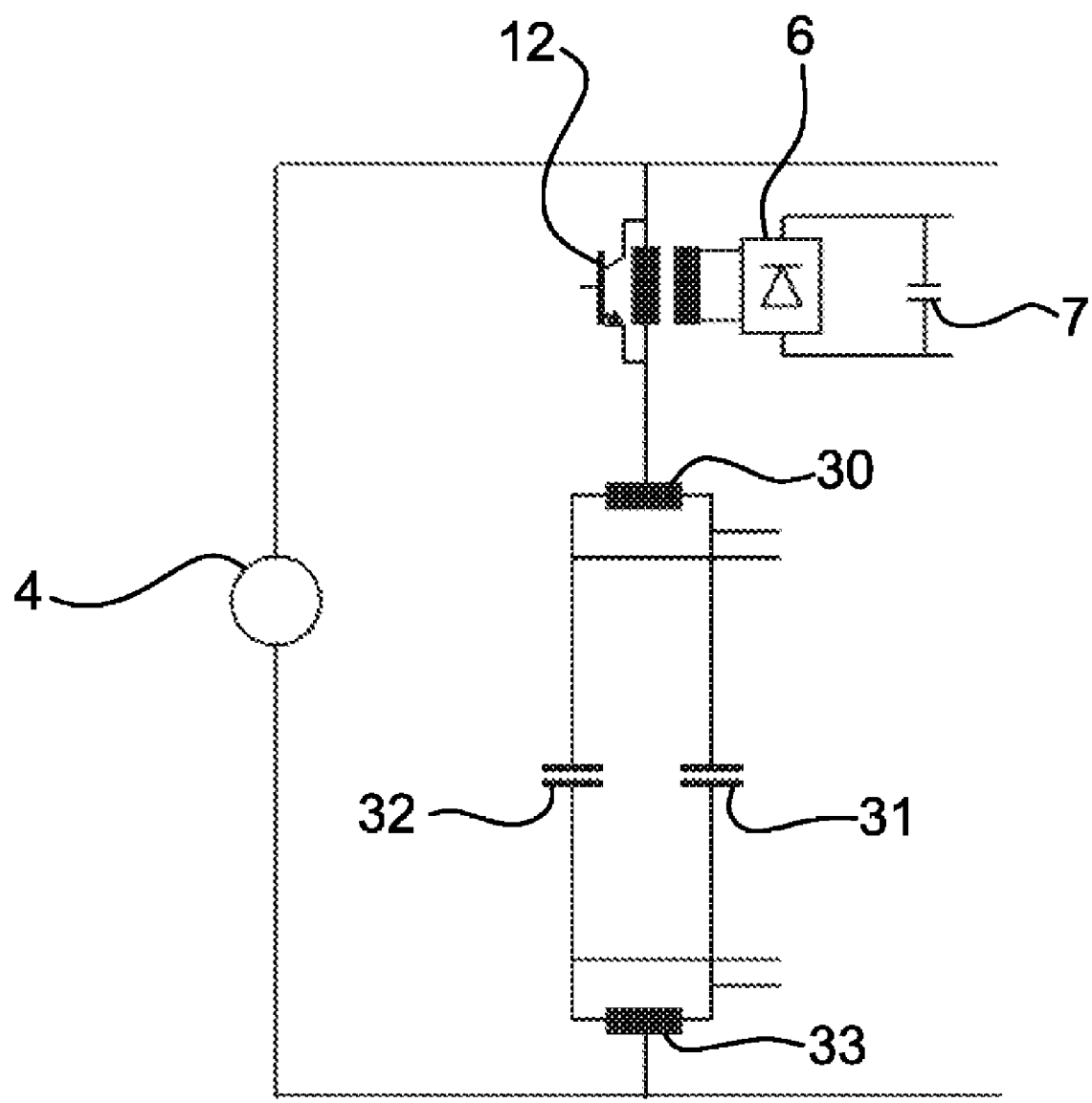
FIG. 7 is a schematic diagram illustrating an environment where an embodiment of the present invention can be applied.

FIG. 7 is a schematic diagram illustrating an environment where an embodiment of the present invention can be applied.

The Swedish patent 0203374-4 (publication number 525006) describes an auxiliary power system based on high-frequency power supply from ground to a high-voltage platform through coupling capacitors.

In this case two coupling capacitors 31, 32 are used. They are connected at each end by grounding transformers 30, 33, which carries the 50 or 60 Hz current to a common midpoint. This current can be used in the same way as has been described above. FIG. 7 illustrates an example of the connection.

Different types of semiconductor devices may replace the transistors shown herein. For example, bidirectional bypass switches comprising thyristors, gate-turnoff thyristors or insulated gate bipolar transistors may be utilized.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A power supply apparatus comprising:
   a coupling capacitor arranged to be connected on a first end thereof to ground;
   a transformer comprising a primary winding and a secondary winding;
   a first rectifier bridge connected in parallel with said secondary winding; and
   an energy storage element, to which a load is arranged to be connected;
   a bypasser including:
      a second rectifier bridge connected in parallel with said primary winding;
      a first transistor connected with a collector and emitter thereof in parallel with said second rectifier bridge; and
      a controller;
   wherein said primary winding is connected between a second end of said coupling capacitor, and a high voltage transmission line such that when the bypasser is not activated, substantially all current between said second end of said coupling capacitor and said high voltage transmission line passes through said primary winding;
   said energy storage element charged by current passing through said first rectifier bridge.

2. The power supply apparatus according to claim 1, wherein said power supply apparatus is connected to a high voltage transmission line with a rated line voltage ranging from about 110 kV to about 800 kV rms line-to-line.

3. The power supply apparatus according to claim 1, wherein said coupling capacitor is arranged to be galvanically connected to ground.

4. The power supply apparatus according to claim 1, wherein said energy storage element is connected in parallel with said first rectifier bridge.

5. The power supply apparatus according to claim 1, wherein said controller is arranged to continuously control said first transistor.

6. The power supply apparatus according to claim 1, wherein said controller is arranged to switch in and out said first transistor with a duty cycle that is several periods of a network frequency.

7. The power supply apparatus according to claim 1, wherein said controller is located on a secondary winding side, and command signals are transferred from said controller to said first transistor via an optocoupler.

8. The power supply apparatus according to claim 1, further comprising an over-voltage limitation means which is independent of command signals to said first transistor.

9. The power supply apparatus according to claim 8, wherein said over-voltage limitation means comprises a zener diode.

10. The power supply apparatus according to claim 1, further comprising:
   a plurality of said transformers;
   wherein each of said plurality of transformers comprises:
      a primary winding circuit, comprising said primary winding, said second rectifier bridge and said first transistor; and
      a secondary winding circuit, comprising said secondary winding, said first rectifier bridge and said energy storage element; and all primary windings of said plurality of transformers are connected in a serial connection.

11. The power supply apparatus according to claim 10, further comprising:
   a protection capacitor connected in parallel with said serial connection of primary windings;
   a resistor connected in series with said parallel connection of said protection capacitor and said serial connection of primary windings; and
   a varistor connected in parallel between said serial connection of said resistor and said parallel connection of said protection capacitor and said serial connection of primary windings,
   wherein said varistor is connected to said coupling capacitor and said varistor is arranged to be connected to said high voltage transmission line.

12. The power supply apparatus according to claim 11, wherein said resistor is arranged to be connected to said high voltage transmission line and said protection capacitor is connected to said coupling capacitor.

13. The power supply apparatus according to claim 11, wherein said resistor is connected to said coupling capacitor and said protection capacitor is arranged to be connected to said high voltage transmission line.

14. The power supply apparatus according to claim 1, further comprising:
   one primary winding circuit comprising said primary winding, said second rectifier bridge and said first transistor; and
   a plurality of secondary winding circuits, wherein each secondary winding circuit comprises said secondary winding, said first rectifier bridge and said energy storage element;
   wherein said first primary winding circuit is coupled to all of said secondary winding circuits in said transformer.

15. The power supply apparatus according to claim 1, further comprising a second coupling capacitor, and said two coupling capacitors are both connected via a second transformer to ground and via a third transformer to said primary winding.

16. An apparatus comprising:
   a power supply apparatus according to claim 1,
   wherein said first end of said coupling capacitor is connected to ground and said second end of said primary winding is connected to a high voltage transmission line.

17. A three phase power supply apparatus comprising three power supply apparatuses according to claim 1, wherein each of said three power supply apparatuses is arranged to be connected to a transmission line of respective one of three phases.

18. A power supply apparatus comprising:
   a coupling capacitor connected on a first end thereof to ground;
   a transformer having a primary winding and a secondary winding;
   a first rectifier bridge connected in parallel with said secondary winding; and
   an energy storage element, to which a load is arranged to be connected;
   said transformer comprising a bypasser such that when operated in a saturation mode, said transformer limits power to said secondary winding of said transformer;
   wherein said primary winding is connected directly between a second end of said coupling capacitor without any intervening elements, and a high voltage transmission line such that all current between said second end of said coupling capacitor and said high voltage transmission line passes through said primary winding;
   said energy storage element charged by current passing through said first rectifier bridge.

19. A power supply apparatus comprising:
   a coupling capacitor connected on a first end thereof to ground;
   a transformer comprising a primary winding and a secondary winding;
   a first rectifier bridge connected in parallel with said secondary winding; and
   an energy storage element, to which a load is arranged to be connected;
   a bypasser including controlled semiconductor components arranged as a bidirectional bypass circuit;
   said bypasser connected in parallel with said primary winding of said transformer;
   wherein said primary winding is connected directly between a second end of said coupling capacitor without any intervening elements, and a high voltage transmission line such that when the bypasser is not activated, substantially all current between said second end of said coupling capacitor and said high voltage transmission line passes through said primary winding;
   said energy storage element charged by current passing through said first rectifier bridge.

* * * * *